United States Patent
Ban et al.

(10) Patent No.: US 10,498,020 B2
(45) Date of Patent: Dec. 3, 2019

(54) ANTENNA AND COMMUNICATION APPARATUS

(71) Applicant: FUJITSU LIMITED, Kawasaki-shi, Kanagawa (JP)

(72) Inventors: Yasumitsu Ban, Kawasaki (JP); Manabu Kai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/112,107

(22) Filed: Aug. 24, 2018

(65) Prior Publication Data
US 2019/0074581 A1    Mar. 7, 2019

(30) Foreign Application Priority Data

Sep. 1, 2017 (JP) ................................ 2017-168477

(51) Int. Cl.
| | | |
|---|---|---|
| *H01Q 9/28* | (2006.01) | |
| *H01Q 1/44* | (2006.01) | |
| *H01Q 1/48* | (2006.01) | |
| *H04B 1/40* | (2015.01) | |

(52) U.S. Cl.
CPC ................. *H01Q 1/44* (2013.01); *H01Q 1/48* (2013.01); *H04B 1/40* (2013.01)

(58) Field of Classification Search
CPC combination set(s) only.
See application file for complete search history.

(56) References Cited

U.S. PATENT DOCUMENTS

| | | | |
|---|---|---|---|
| 6,486,847 B1 | 11/2002 | Yamamoto et al. | |
| 7,158,089 B2* | 1/2007 | Mohammadian | ........ H01Q 1/38 |
| | | | 343/700 MS |
| 7,408,513 B1* | 8/2008 | Yanagi | ..................... H01Q 9/40 |
| | | | 343/700 MS |
| 8,094,077 B2* | 1/2012 | Yanagi | ................. H01Q 1/2266 |
| | | | 343/700 MS |

(Continued)

FOREIGN PATENT DOCUMENTS

| | | |
|---|---|---|
| JP | H08-288723 A | 11/1996 |
| JP | H11-308312 A | 11/1999 |

(Continued)

OTHER PUBLICATIONS

S.L. Zuo et al., "Enhanced bandwidth of low-profile sleeve monopole antenna for indoor base station application", Electronics Letters, vol. 46, No. 24, Dec. 6, 2010, pp. 1587-1588, XP055542022.

(Continued)

*Primary Examiner* — Cindy Trandai
(74) *Attorney, Agent, or Firm* — Fujitsu Patent Center (57) ABSTRACT

An antenna includes, a radiation conductor that is fed by one end, has another end serving as an opened end, and emits or receives radio waves, a first grounding conductor that is installed at the one end side of the radiation conductor and is grounded, a second grounding conductor that is electrically coupled with the first grounding conductor and is formed in a cylindrical shape around the radiation conductor with an elongation direction of the radiation conductor as an axial direction. At least one of the first grounding conductor and the second grounding conductor is electric-field coupled with a conductor where the antenna is installed.

7 Claims, 11 Drawing Sheets

(56) References Cited

U.S. PATENT DOCUMENTS

| | | | |
|---|---|---|---|
| 9,887,466 B2* | 2/2018 | Ermutlu | H01Q 1/24 |
| 2004/0100406 A1* | 5/2004 | Okado | H01Q 1/38 |
| | | | 343/700 MS |
| 2005/0140557 A1* | 6/2005 | Kuroda | H01Q 1/38 |
| | | | 343/773 |
| 2005/0233786 A1* | 10/2005 | Hatch | G06F 1/1616 |
| | | | 455/575.7 |
| 2007/0030199 A1* | 2/2007 | Chen | H01Q 1/362 |
| | | | 343/700 MS |
| 2007/0176828 A1* | 8/2007 | Kuroda | H01Q 1/38 |
| | | | 343/700 MS |
| 2007/0262905 A1* | 11/2007 | Iio | H01Q 1/362 |
| | | | 343/700 MS |
| 2011/0279342 A1* | 11/2011 | Takahashi | H01Q 9/0407 |
| | | | 343/845 |
| 2015/0357706 A1* | 12/2015 | Kubo | H01Q 1/38 |
| | | | 343/848 |
| 2017/0194720 A1* | 7/2017 | Duan | H01Q 1/48 |
| 2018/0138599 A1* | 5/2018 | Shehan | H01Q 9/32 |

FOREIGN PATENT DOCUMENTS

| | | |
|---|---|---|
| JP | 2001-308630 A | 11/2001 |
| JP | 2005-94745 A | 4/2005 |

OTHER PUBLICATIONS

Zhong-Da Wu et al., "Broadband sleeve monopole with very small ground impedance matching network and resistive load", 2012 IEEE 5th Global Symposium on Millimeter Waves, May 27, 2012, pp. 88-91, XP032242925.

Deng Changjiang et al., "High Gain Monopole Antenna With Sleeve Ground Plane for WLAN Applications", IEEE Antennas and Wireless Propagation Letters, vol. 16, May 18, 2017, pp. 2199-2202, XP011658524.

Yasuhiro Nishioka et al., "Small Planar Sleeve Antenna for Portable Wireless Terminals", Piers, Mar. 28, 2004, 1 page, XP055542257.

EESR—Extended European Search Report of European Patent Application No. 18189776.0 dated Jan. 25, 2019.

Eun-Suk Yang et al., "A Low Profile Circular Patch Loaded Monopole Antenna Embedded in a Manhole Cover", 2017 IEEE, International Symposium on Antennas and Propagation & USNC/URSI National Radio Science Meeting, Jul. 2017, pp. 1001-1002.(Total pp. 2).

* cited by examiner

ANTENNA AND COMMUNICATION APPARATUS

CROSS-REFERENCE TO RELATED APPLICATION

This application is based upon and claims the benefit of priority of the prior Japanese Patent Application 2017-168477, filed on Sep. 1, 2017, the entire contents of which are incorporated herein by reference.

FIELD

The embodiments discussed hereto are related to, for example, an antenna and a communication apparatus including the antenna.

BACKGROUND

Antennas have been used for various usages of transmitting or receiving radio waves. Particularly, a monopole antenna is used as one of the antennas which have relatively strong radiation patterns with respect to a direction parallel to an installation surface of the antenna. However, depending on a case, an available space for installing an antenna may be limited, so that it is difficult to install a monopole antenna. Accordingly, a monopole antenna which may be manufactured in a compact size, has been suggested (see, e.g., Japanese Laid-Open Patent Publication No. 2001-308630). The monopole antenna includes a grounding conductor, a power feeding unit positioned on a surface of the grounding conductor, an antenna element connected to the power feeding unit, a lateral conductor which surrounds a region around a space including the antenna element while being spaced apart from the antenna element, and a ceiling conductor which faces the grounding conductor with the antenna element interposed therebetween.

According to a grounding environment, there may be a case where a region around the antenna is surrounded by a conductor. In this situation, there may be a case where a radiation characteristic of the antenna does not satisfy a desired characteristic by an influence of the conductor around the antenna. Accordingly, there is suggested a monopole antenna which is designed on the premise that the mono pole antenna is embedded in a manhole cover and includes a circular patch in which power is fed from a center thereof, and two short-circuit strips (see e.g., Non-Patent Document 1).

Related technologies are disclosed in, for example, Japanese Laid-Open Patent Publication No. 2001-308630 and Eun-Suk Yang et al., "A Low Profile Circular Patch Loaded Monopole Antenna Embedded in a Manhole Cover" (Non-Patent Document 1).

In the monopole antenna described in Non-Patent Document 1, in order to obtain a desired radiation characteristic, the manhole cover and the patch are required to be disposed while having a space in some degree, so that there is a need for an installation space to have a size in some degree. However, depending on a case, a gap may not be sufficiently secured between the peripheral conductor and the patch.

SUMMARY

According to an aspect of the embodiments, an antenna includes, a radiation conductor that is fed by one end, has another end serving as an opened end, and emits or receives radio waves, a first grounding conductor that is installed at the one end side of the radiation conductor and is grounded, a second grounding conductor that is electrically coupled with the first grounding conductor and is formed in a cylindrical shape around the radiation conductor with an elongation direction of the radiation conductor as an axial direction. At least one of the first grounding conductor and the second, grounding conductor is electric-field coupled with a conductor where the antenna is installed.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, an antenna will be described with reference to the accompanying drawings. The antenna includes a first grounding conductor which is installed at one end side of a radiation conductor and has a flat plate shape, and a second grounding conductor which is electrically connected with the first grounding conductor and is formed to surround a region around the radiation conductor in a cylinder shape, so as to be embedded within a member formed of a conductor. Further, at least one of the first grounding conductor and the second grounding conductor may be electric-field coupled to a peripheral member formed of a conductor. Further, the conductor which is electric-field coupled to at least one of the first grounding conductor and the second grounding conductor is not limited to a metal, and may be a liquid having an electrifying property, such as water, graphite, a human body, or an animal body.

Hereinafter, for convenience of description, a surface of a side at which the first grounding conductor is installed is called a bottom surface, and a surface of a side which faces the bottom surface with a radiation conductor interposed therebetween, is called an upper surface.

Figure 1A:
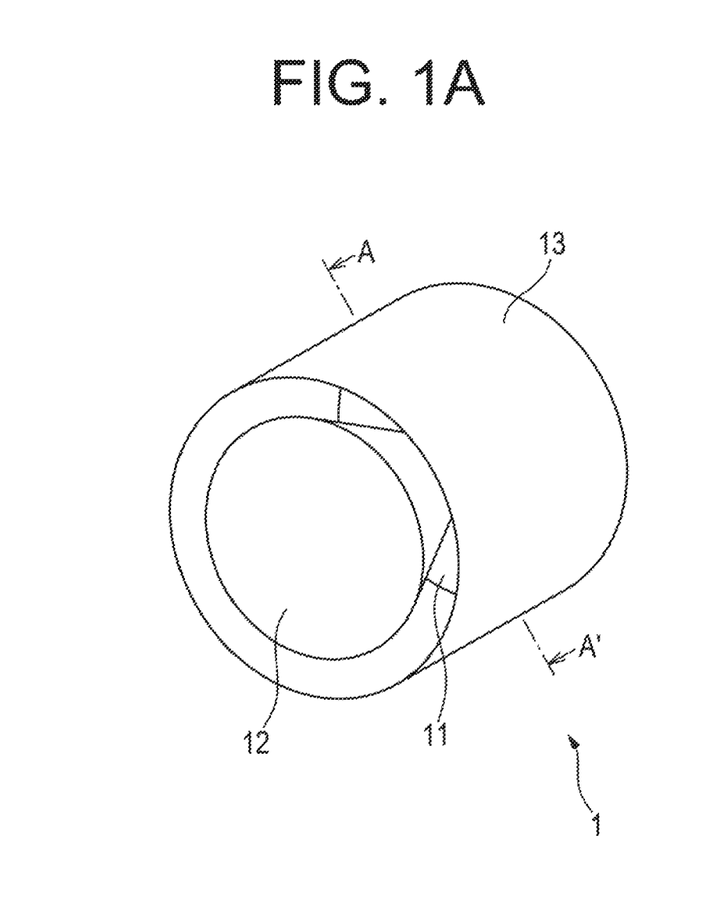
FIG. 1A is a perspective view of an antenna according to an embodiment.
Figure 1B:
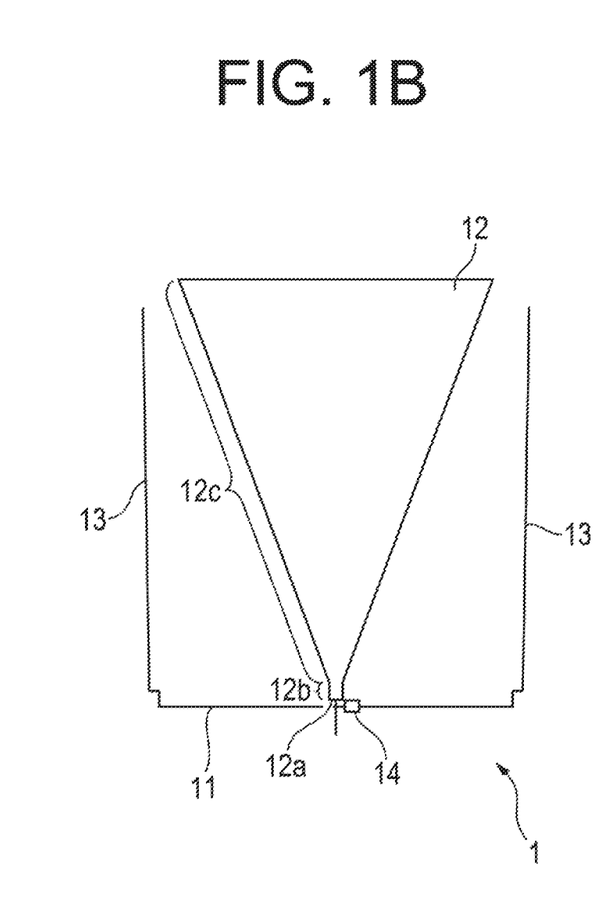
FIG. 1B is a lateral cross-sectional view of the antenna illustrated in FIG. 1A viewed from a side indicated by the arrow AA'.

FIG. 1A is a perspective view of an antenna according to an embodiment. FIG. 1B is a lateral cross-sectional view of the antenna illustrated in FIG. 1A viewed from a side indicated by the arrow AA'.

An antenna 1 is a so-called monopole antenna, and includes a first grounding conductor 11, a radiation conductor 12, a second grounding conductor 13, and a matching circuit 14.

The first grounding conductor 11 is an example of a grounded conductor, is formed in a disc shape by a conductor of a metal material such as, for example, copper or gold, or other conductors, and is grounded. Further, a hole that allows a signal line (e.g., a coaxial cable) which feeds power to the radiation conductor 12 to pass is formed at substantially the center of the first grounding conductor 11. Further, for example, the first grounding conductor 11 is connected to an external conductor of a coaxial cable which feeds power to the radiation conductor 12.

The radiation conductor 12 is formed to be elongated from substantially the center of the first grounding conductor 11 to an upper surface side along a normal direction of the first grounding conductor 11 by a conductor of a metal material such as, for example, copper or gold, or other conductors, and radiates or receives radio waves. That is, in the present embodiment, the elongation direction of the radiation conductor 12 is parallel to the normal direction of the first grounding conductor 11. Further, in the present embodiment, the radiation conductor 12 has a rod-shaped portion 12b elongated from one end of the bottom surface side to the other end of the upper surface side along a normal line of the radiation conductor 12, and a conical portion 12c positioned at a higher upper surface side than the rod-shaped portion 12b and having a conical shape. The conical portion 12c is formed such that an area in a surface orthogonal to the elongation direction of the radiation conductor 12 becomes larger as the area approaches the other end of the upper surface side. Further, the conical portion 12c of the radiation conductor 12 may be formed in a shape of a polygonal pyramid, such as a triangular pyramid, a quadrangular pyramid, or a hexagonal pyramid. The radiation conductor 12 is formed as described above, so that a frequency band usable by the antenna 1 may have a broadband and the radiation conductor 12 may be shortened. Further, the radiation conductor 12 is fed via a coaxial cable passing through a hole formed at the center of the first grounding conductor 11 at a feeding point 12a which is one end of the bottom surface side. Further, an end portion of the upper surface side of the radiation conductor 12 becomes an opened end. Further, the radiation conductor 12 has a length of about ¼ of a designed wavelength or a slightly smaller length than about ¼ of the design wavelength corresponding to a frequency of a radio wave emitted or received by the antenna 1 (hereinafter, referred to as an operating frequency) along the normal direction of the first grounding conductor 11. Accordingly, the radiation conductor 12 may emit or receive the radio wave at the frequency corresponding to the design wavelength.

The second grounding conductor 13 is formed, for example, in a cylindrical shape in which the elongation direction of the radiation conductor 12 serves as an axial direction, so as to be spaced apart from the radiation conductor 120 and surround a region around the radiation conductor 12, by a conductor of a metal material such as, for example, copper or gold, or other conductors. In the present embodiment, the second grounding conductor 13 is electrically connected with an outer periphery of the first grounding conductor 11 at one end of the bottom surface side. As a result, the second grounding conductor 13 is also grounded. Further, the second grounding conductor 13 may be formed in such a manner than an inner diameter of the end portion of the bottom surface side is the same as an inner diameter of the end portion of the upper surface side, or an inner diameter of the end portion of the upper surface side may be larger than an inner diameter of the end portion bottom surface side. For example, the second grounding conductor 13 may be formed in a tapered shape so that an inner diameter becomes larger toward the upper surface side, or may be formed in a step shape. Further, the first grounding conductor 11 and the second grounding conductor 13 may be integrally formed.

In the elongation direction of the radiation conductor 12, the length of the second grounding conductor 13 may be the same as or smaller than the length of the radiation conductor 12. Accordingly, it is difficult for the radio-wave emitted from the radiation conductor 12 to be blocked by the second grounding conductor 13, so that a decrease in a gain of the antenna 1 is suppressed. In the meantime, in order for the antenna 1 to resonate at the operating frequency, as the length of the second grounding conductor 13 is decreased in the elongation direction of the radiation conductor 12, a diameter of the end portion of the upper surface side of the radiation conductor 12 becomes larger and approaches the member, in which the antenna 1 is embedded. Accordingly, a length of the second grounding conductor 13 in the elongation direction of the radiation conductor 12 may be a length in which the radiation conductor 12 is not electric-field coupled to the member, in which the antenna 1 is embedded, for example, a half or more of the length of the radiation conductor 12 in the elongation direction of the radiation conductor 12.

At least one of the first grounding conductor 11 and the second grounding conductor 13 may be electric-field coupled to a conductor that forms the member, in which the antenna 1 is installed. That is, in the state where the first grounding conductor 11 is electric-field coupled to the conductor located at a position closer to the bottom surface side than the antenna 1 or the second grounding conductor 13 is electric-field coupled to the conductor located in an outer periphery of the second grounding conductor 13, impedance of the antenna 1 is matched to a predetermined impedance at the operating frequency. Accordingly, the antenna 1 may be installed in such a manner that the end portion of the bottom surface side and the outer periphery of the second grounding conductor 13 are surrounded by the member formed of the conductor.

The matching circuit 14 is installed in the feeding point 12a of the radiation conductor 12 so that the impedance of the antenna 1 is matched to a predetermined impedance (e.g., 50Ω). In the state where the antenna 1 is embedded in the member formed of the conductor. The matching circuit 14 may be a lumped constant device. In this case, the matching circuit 14 may be, for example, an inductance element having an inductance component, such as a coil, or a capacity element having a capacity component. Further, the matching circuit 14 may also be, for example, an interdigital type distributed parameter circuit formed by a pattern or a conductor on the same surface as that of the first grounding conductor 11. Further, the impedance of the antenna 1 may be a predetermined impedance even without the matching circuit 14 according to a gap between the radiation conductor 12 and the second grounding conductor 13 or a size of the radiation conductor 12. In this case, the matching circuit 14 may be omitted.

The radiation conductor 12 and the second grounding conductor 13 may be spaced apart from each other by air. Alternatively, in order to fix the first grounding conductor 11, the radiation conductor 12, and the second grounding conductor 13, a dielectric body may be filled in the portion around the radiation conductor 12 surrounded by the first grounding conductor 11 and the second grounding conductor 13. Further, a dielectric body may be installed in a region around the second grounding conductor 13.

Figure 2A:
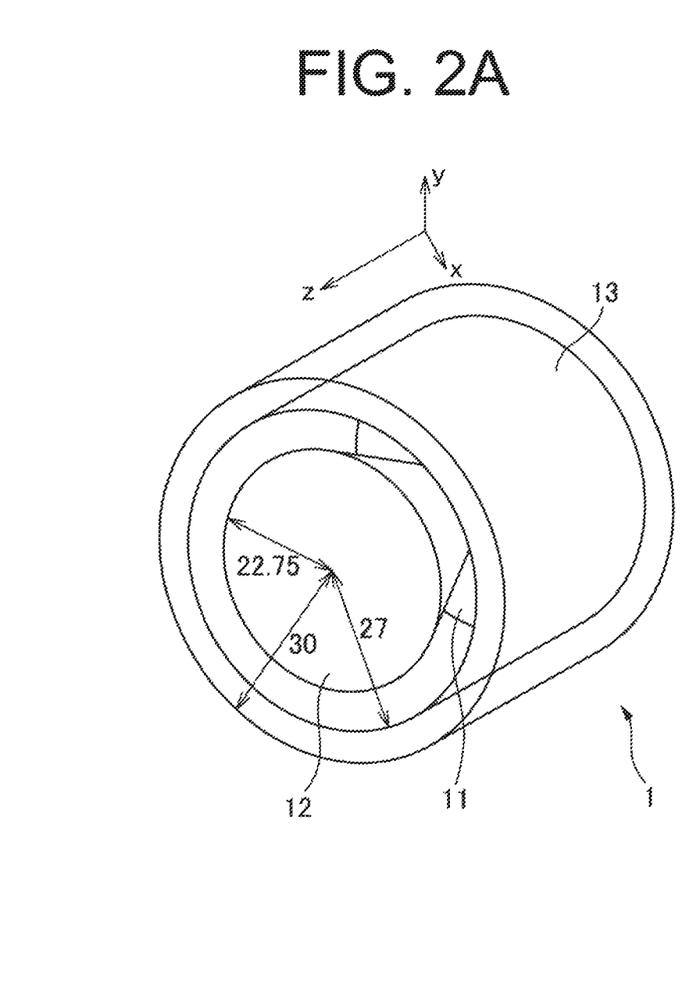
FIG. 2A is a perspective view of the antenna illustrating a dimension of each unit used in an electromagnetic field simulation of a characteristic of the antenna according to the embodiment.
Figure 2B:
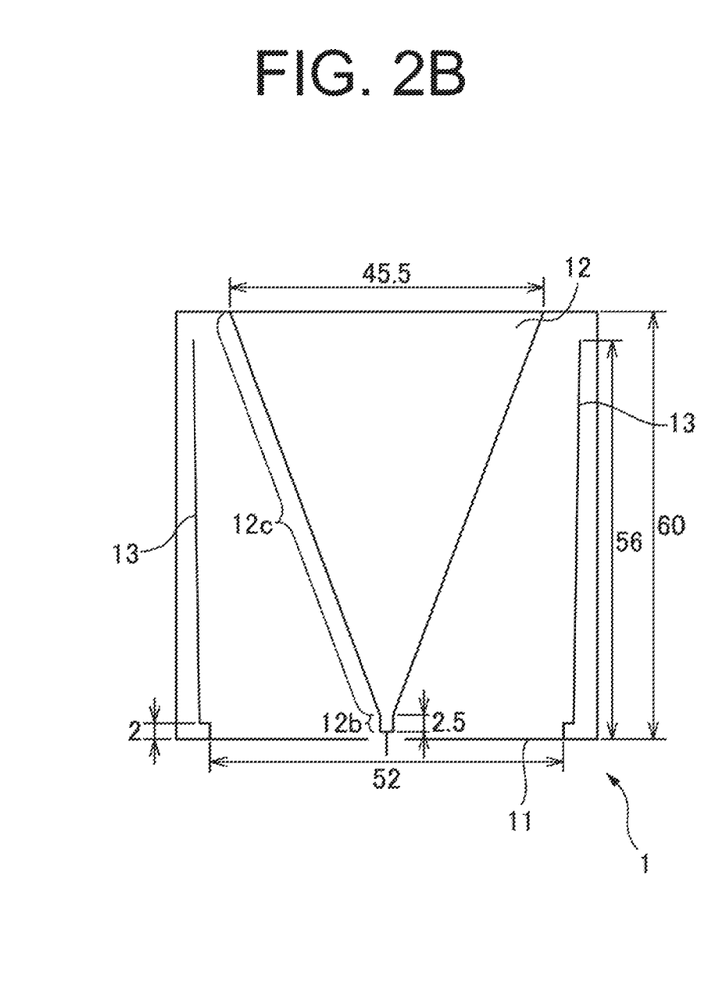
FIG. 2B is a lateral cross-sectional view of the antenna illustrating a dimension of each unit used in an electromagnetic field simulation of characteristic of antenna according to the embodiment.

Hereinafter, an antenna characteristic of the antenna 1 obtained by an electromagnetic field simulation will be described. FIG. 2A is a perspective view of the antenna illustrating a dimension of each unit used in an electromagnetic field simulation of a characteristic of the antenna 1. FIG. 2B is a lateral cross-sectional view of the antenna 1 illustrating a dimension of each unit used in an electromagnetic field simulation of a characteristic of the antenna 1. In the electromagnetic field simulation, the operating frequency of the antenna 1 is 920 MHz. Further, the elongation direction of the radiation conductor 12 is assumed to be a z-axis, and two axes orthogonal to each other in a surface orthogonal to the z-axis, that is, a plane parallel to the upper surface, are assumed to be an x-axis and a y-axis, respectively.

In the electromagnetic field simulation, the antenna 1 is assumed to be embedded in a dielectric body which has a radius of 30 mm, has a length of 60 mm in the elongation direction of the radiation conductor 12, and is in a cylindrical shape with the radiation conductor 12 as a center. Further, it is assumed that specific inductive capacity εr of the dielectric body is 4.2, and dielectric tangent tan δ is 0.003.

In the electromagnetic field simulation, as a comparative example, an antenna characteristic of a monopole antenna has been investigated in which the second grounding conductor 13 is emitted from the antenna 1. Further, each of the antenna 1 and the monopole antenna according to the comparative example is assumed to be disposed so that the bottom surface and the outer periphery of the dielectric body are surrounded by a conductor, and are in contact with the conductor.

The first grounding conductor 11 is assumed to have a diameter of 52 mm and a thickness of 0.03 mm. Further, an inner diameter of a portion of 2 mm from the bottom surface side of the second grounding conductor 13 is set to 52 mm, and an inner diameter of a portion, of the upper surface side of the portion is set to 54 mm, and a thickness of the portion is set to 0.02 mm. Further, a length of the second grounding conductor 13 along the elongation direction of the radiation conductor 12 is set to 56 mm. Further, a length of the radiation conductor 12 in the elongation direction is set to 60 mm, a diameter of a rod-shaped portion is set to 2 mm, and a length of the rod-shaped portion of the radiation conductor 12 in the elongation direction is set to 2.5 mm. Further, a diameter of the upper surface of the radiation conductor 12 is set to 45.5 mm. Further, the matching circuit 14 is assumed to include a capacitive element which is connected with the radiation conductor 12 in parallel and has electrostatic capacity of 0.8 pF, and a capacitive element which is connected between the radiation conductor 12 and a communication circuit (not illustrated) emitting radio waves to the antenna 1 in series and has electrostatic capacity of 0.4 pF.

Figure 3:
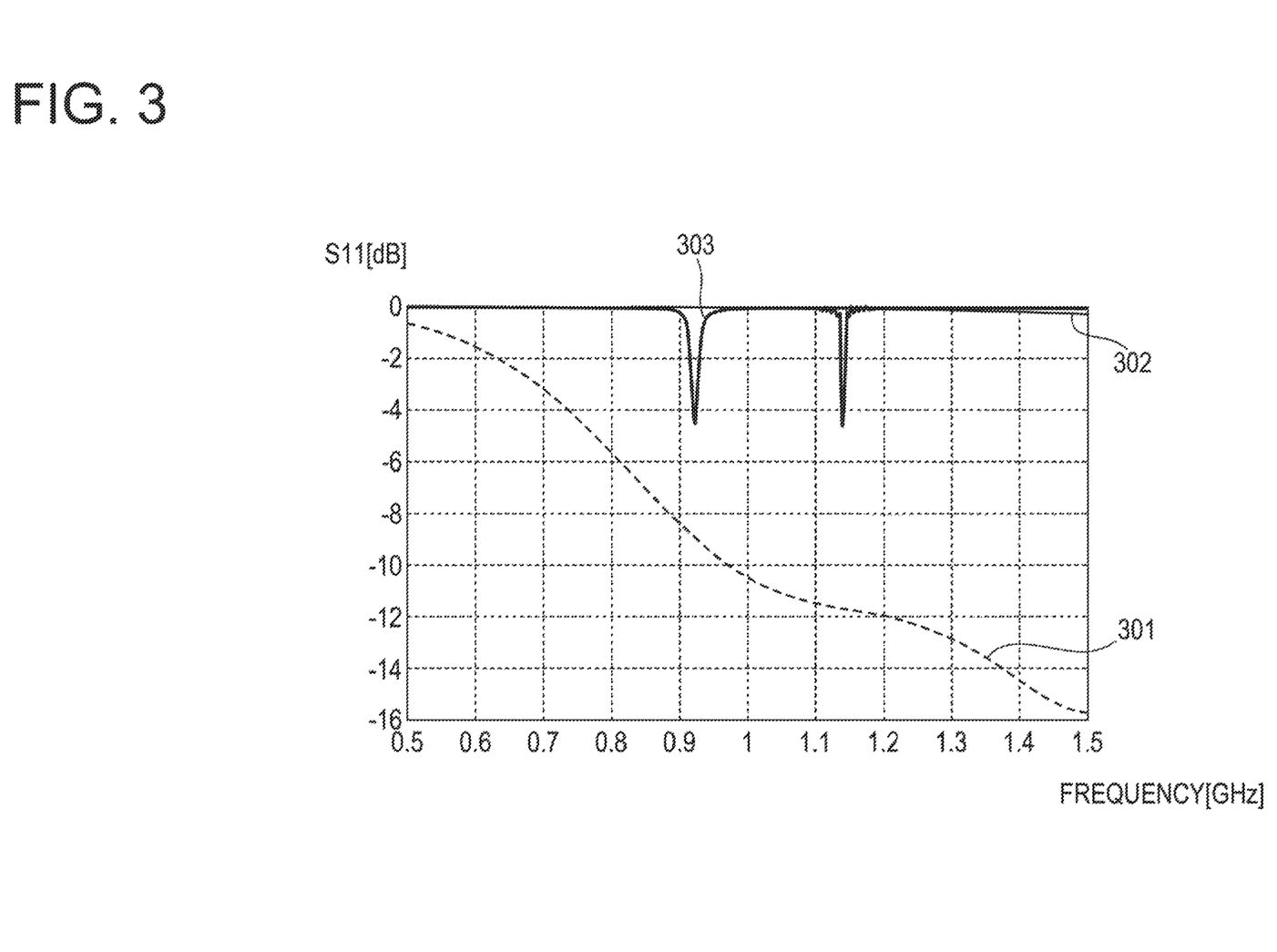
FIG. 3 is a diagram representing frequency characteristics of parameter S11 of the antenna according to the embodiment and a monopole antenna according to a comparative example obtained by the electromagnetic field simulation.

FIG. 3 is a diagram representing frequency characteristics of parameter S11 of the antenna 1 and the monopole antenna according to the comparative example obtained by the electromagnetic field simulation. In FIG. 3, a horizontal axis indicates a frequency, and a vertical axis indicates parameter S11. Further, a graph 301 represents a frequency characteristic of parameter S11 when the monopole antenna according to the comparative example is installed in the air as reference, and a graph 302 represents a frequency characteristic of parameter S11 when the monopole antenna according to the comparative example is installed so as to be surrounded by the conductor. Further, a graph 303 represents a frequency characteristic of parameter S11 of the antenna 1.

As represented in the graph 301, parameter S11 of the monopole antenna according to the comparative example is impedance-matched to a wide frequency band including an operating frequency of 920 MHz when the monopole antenna is installed in the air. However, as represented in the graph 302, when the monopole antenna according to the comparative example is installed to be surrounded by the conductor, it may be seen that parameter S11 is about 0 dB over the frequency band of 0.5 GHz to 1.5 GHz and is not impedance-matched. In the meantime, as represented in the graph 303, it may be seen that parameter S11 of the antenna 1 is −4 dB or less at the operating frequency of 920 MHz, and the antenna 1 is satisfactorily impedance-matched at the operating frequency.

Figure 4:
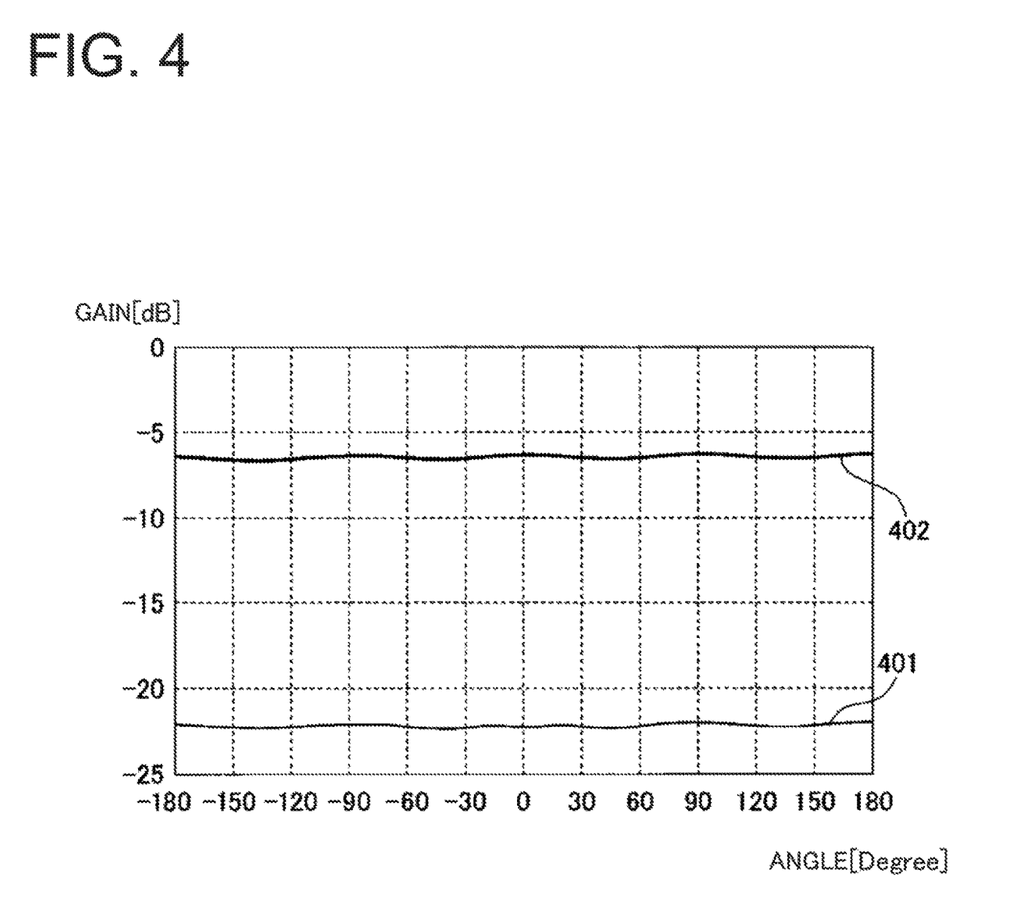
FIG. 4 is a diagram representing angle characteristics of actual gains in planes parallel to upper surfaces of the antenna according to the embodiment and a monopole antenna according to a comparative example obtained by the electromagnetic field simulation.

FIG. 4 is a diagram representing angle characteristics of actual gains in planes parallel to upper surfaces of the antenna 1 and the monopole antenna according to the comparative example obtained by the electromagnetic field simulation. In FIG. 4, a horizontal axis indicates an angle with respect to the x-axis, and a vertical axis indicates an angle characteristic of a gain. Further, a graph 401 represents a gain of the monopole antenna according to the comparative example, and a graph 402 indicates an angle characteristic of a gain of the antenna 1.

As represented in the graph 401, it may be seen that a gain of the monopole antenna according to the comparative example is equal to or less than −20 dB regardless of an angle, and rarely emits radio waves. In the meantime, as represented in the graph 402, it may be seen that the antenna 1 has a gain of about −6 dB regardless of an angle even when the bottom surface and the outer periphery of the antenna 1 are installed to be surrounded by the conductor. That is, it may be seen that the antenna 1 has a non-directional radiation pattern along the plane parallel to the upper surface.

The antenna 1 according to the present embodiment is used by being embedded in a member formed of a conductor, for example, a manhole cover.

Figures 5A, 5B:
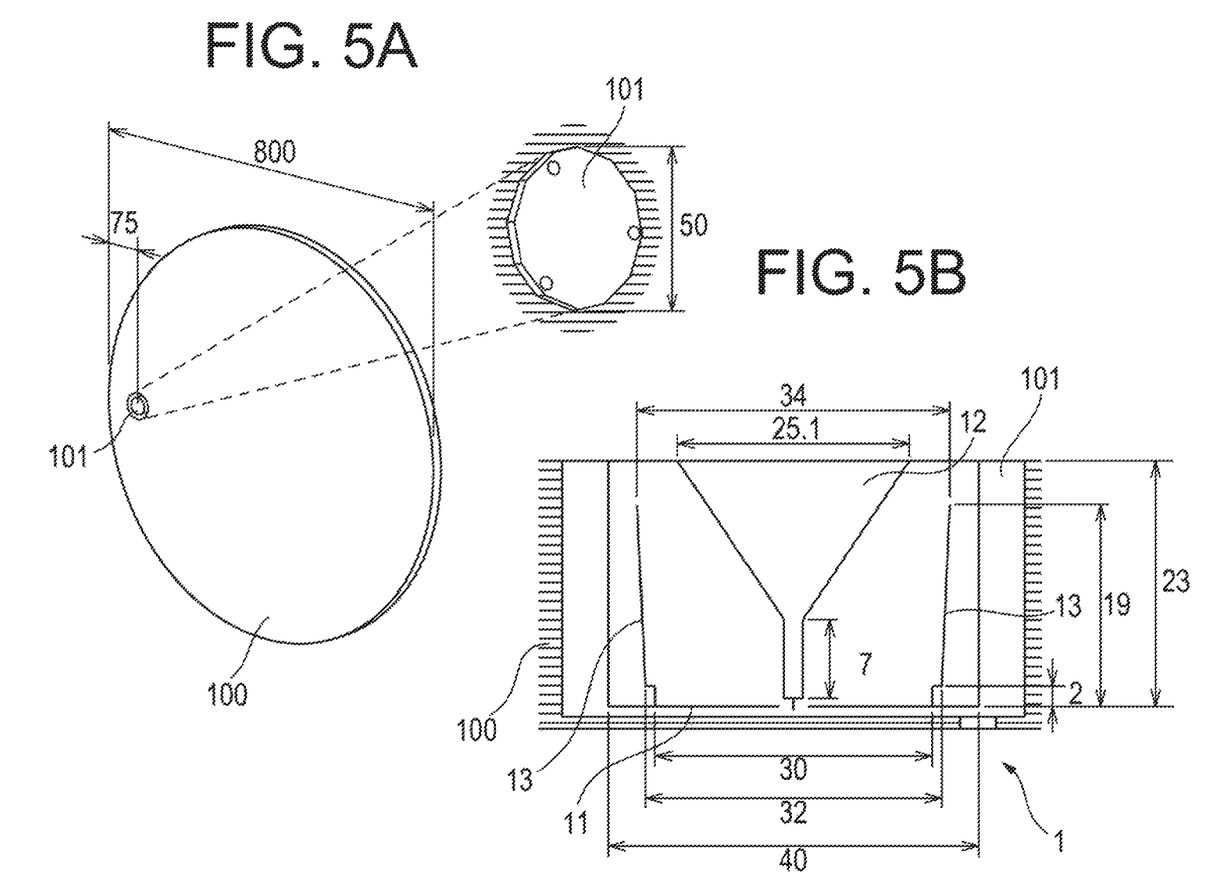
FIG. 5A is a schematic perspective view of an example of a manhole cover, in which the antenna according to the embodiment is embedded.
FIG. 5B is a schematic cross-sectional view of a concave portion, in which the antenna according to the embodiment is embedded.

FIG. 5A is a schematic perspective view of an example of a manhole cover, in which the antenna 1 according to the present embodiment is embedded.

FIG. 5B is a schematic cross-sectional view of a concave portion, in which the antenna 1 is embedded.

Figure 6:
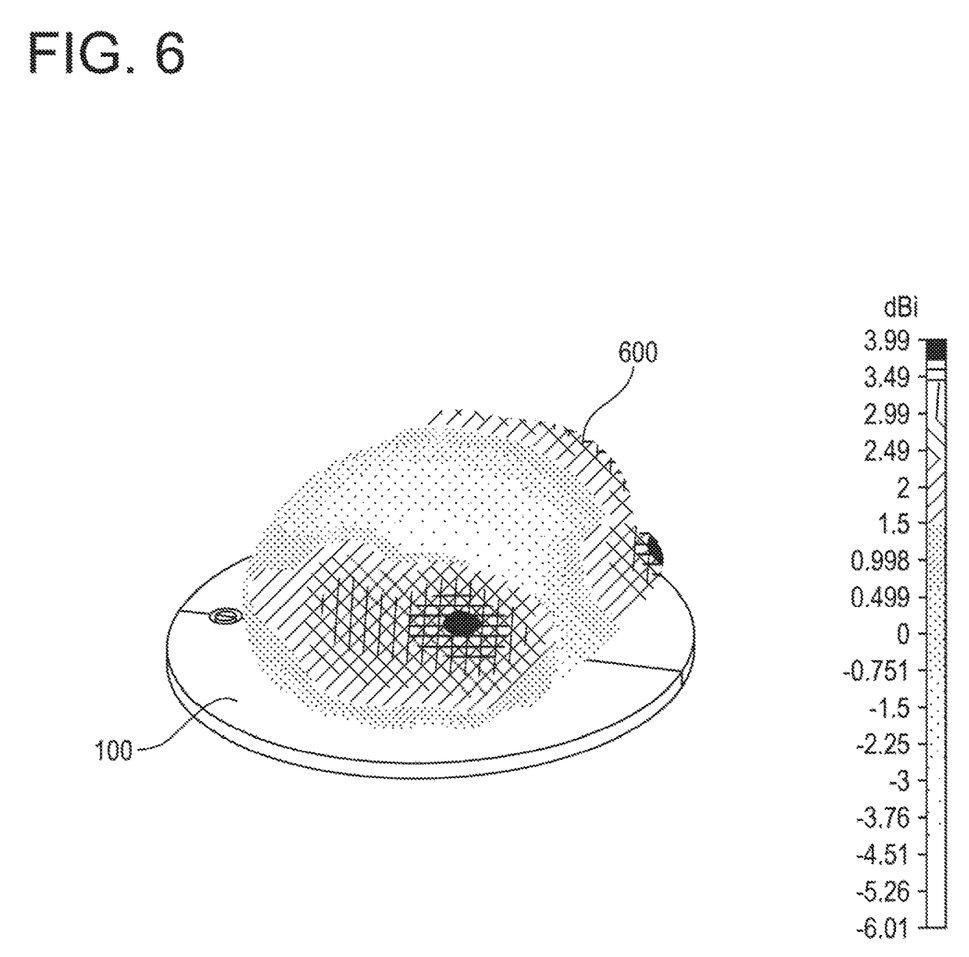
FIG. 6 is a diagram illustrating a radiation pattern of the antenna embedded in a manhole cover illustrated in FIGS. 5A and 5B which is obtained by the electromagnetic field simulation.

FIG. 6 is a diagram illustrating a radiation pattern of the antenna 1 embedded in the manhole cover illustrated in FIGS. 5A and 5B obtained by an electromagnetic field simulation. In the example, a manhole cover 100 is formed in a disc shape having a diameter of 800 mm and a thickness of 25 mm by a conductor having conductivity a of 5.8×107 [S/m]. Further, a concave portion 101, in which the antenna 1 is embedded, is formed as a concave portion having a cylindrical shape having a diameter of 50 mm, and a distance from an outer periphery of the manhole cover 100 to a center of the concave portion 101 is 75 mm. The antenna 1 is installed so that the bottom surface of the antenna 1 faces a bottom surface of the concave portion 101.

In order to make the operating frequency to be 920 MHz, the diameter of the first grounding conductor 11 is set to 32 mm and a thickness of the first grounding conductor 11 is set to 0.03 mm. Further, an inner diameter of a portion of the second grounding conductor 13 up to 2 mm from the end portion of the bottom surface side is set to 30 mm, an inner diameter of a portion at a position of 2 mm from the end portion of the bottom surface side of the second grounding conductor 13 is set to 32 mm, an inner diameter of the end portion of the upper surface side of the second grounding conductor 13 is set to 34 mm, and a thickness of the second grounding conductor 13 is set to 0.02 mm. Further, a length of the second grounding conductor 13 along the elongation direction of the radiation conductor 12 is set to 19 mm. Further, a length of the radiation conductor 12 in the elongation direction is set to 23 mm, a diameter of a rod-shaped portion is set to 2 mm, and a length of the rod-shaped portion of the radiation conductor 12 in the elongation direction is set to 7 mm. Further, a diameter of the upper surface of the radiation conductor 12 is set to 25.1 mm. Further, the matching circuit 14 is assumed to be an inductance element having inductance of 0.4 nH connected with the radiation conductor 12 in parallel. Further, the antenna 1 is embedded in a dielectric body which has a diameter of 40 mm, has a length of 23 mm in the elongation direction of the radiation conductor 12, and is in a cylindrical shape with the radiation conductor 12 as a center. Further, specific inductive capacity εr of the dielectric body is set to 2.5, and dielectric tangent tan δ is set to 0.003. Further, a gap between the bottom surface of the antenna 1 and the bottom surface of the concave portion 101 is set to 1 mm. Further, a space between the dielectric body surrounding the region around the antenna 1 and a lateral wall of the concave portion 101 is assumed to be filled with air.

In a radiation pattern 600 of the antenna 1 illustrated in FIG. 6, it is indicated that a gain becomes larger as the radiation pattern 600 becomes darker. As represented in the radiation pattern 600, it is seen that the antenna 1 has the non-directional radiation pattern along a plane parallel to the upper surface, that is, the surface of the manhole cover 100, in the state where the antenna 1 is embedded in the manhole cover 100.

The antenna 1 may be embedded in another position of the manhole cover. For example, the antenna 1 may be embedded in substantially the center of one surface of the manhole cover. Further, the diameter of the concave portion may become smaller so that a lateral wall of the concave portion, in which the antenna 1 is installed, and the second grounding conductor 13 are electric-field coupled to each other. Alternatively, the diameter of the concave portion may become larger so that a lateral wall of the concave portion, in which the antenna 1 is installed, and the second grounding conductor 13 are not electric-field coupled to each other, that is, only the first grounding conductor 11 in the first grounding conductor 11 and the second grounding conductor 13 is electric-field coupled. As another alternative, the bottom surface of the concave portion, in which the antenna 1 is installed, may be spaced apart from the first grounding conductor 11 so that only the second grounding conductor 13 in the first grounding conductor 11 and the second grounding conductor 13 is electric-field coupled.

As described above, in the antenna, at least one of the first grounding conductor installed at the feeding point side of the radiation conductor and the second grounding conductor installed so as to surround the outer periphery of the radiation conductor may be electric-field coupled to the member formed by the conductor around the antenna. Accordingly, since the antenna may suppress an influence of the member formed by the conductor on the antenna characteristic, the antenna may be installed in a space surrounded by the conductor.

The shape of the radiation conductor is not limited to the shape illustrated in the embodiment.

Figure 7A:
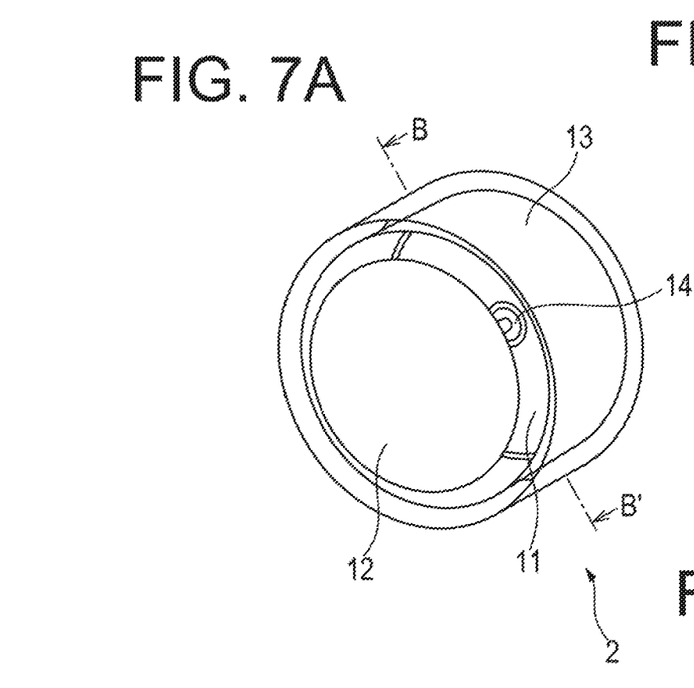
FIG. 7A is a perspective view of an antenna according to a modified example.
Figure 7B:
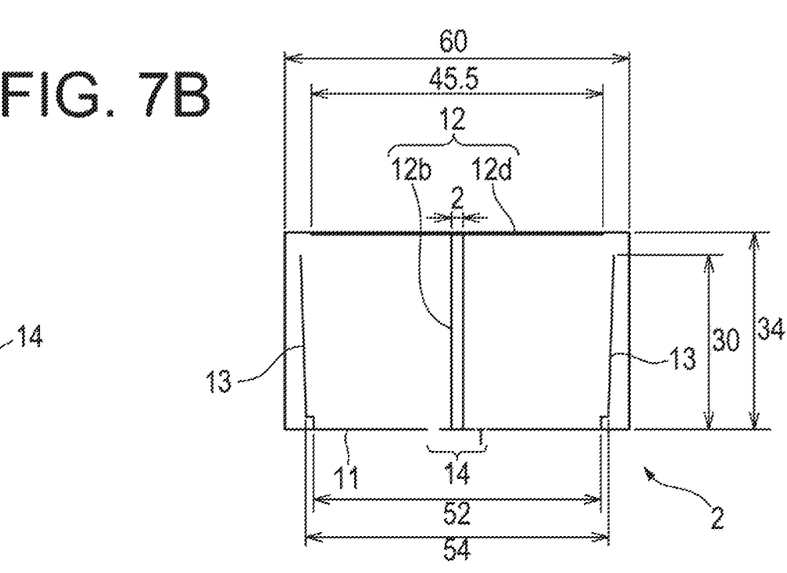
FIG. 7B is a lateral cross-sectional view of the antenna illustrated in FIG. 7A viewed from a side indicated by the arrow BB'.
Figure 7C:
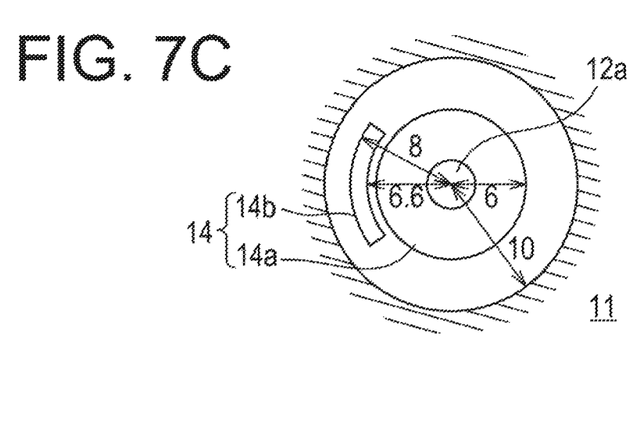
FIG. 7C is a diagram illustrating an example of a pattern formed by a matching circuit.

FIG. 7A is a perspective view of an antenna according to a modified example. FIG. 7B is a lateral cross-sectional view of the antenna illustrated in FIG. 7A viewed from a side indicated by the arrow BB'. Further, FIG. 7C is a diagram illustrating an example of a pattern of a conductor formed on a surface, on which the first grounding conductor is installed, as the matching circuit 14. An antenna 2 according to the present modified example also includes a first grounding conductor 11, a radiation conductor 12, a second grounding conductor 13, and a matching circuit 14, similarly to the antenna 1 according to the embodiment. The antenna 2 according to the modified example is different from the antenna 1 in a shape of the radiation conductor 12 and the matching circuit 14. Accordingly, the shape of the radiation conductor 12 and the matching circuit 14 will be described below.

In the modified example, the radiation conductor 12 has a rod-shaped portion 12b elongated along a normal line of the first grounding conductor 11, and a disc-shaped portion 12d which faces the first grounding conductor 11 with the rod-shaped portion 12b interposed therebetween, is approximately parallel to the first grounding conductor 11 and is formed in a disc shape. Further, in the modified example, the radiation conductor 12 is fed via a feeding point 12 formed at one end of the first grounding conductor 11 and the matching circuit 14.

In the example, as illustrated in FIG. 7C, the matching circuit 14 has a circular pattern 14a which is formed at substantially the center of the first grounding conductor 11 and is connected to the feeding point 12a of the radiation conductor 12, and an arcuate pattern 14b formed between the pattern 14a and the first grounding conductor 11. Further, the radiation conductor 12 is fed via the pattern 14b. Accordingly, a capacitive element connected to the radiation conductor 12 in series is formed between the pattern 14a and the pattern 14b, and a capacitive element connected to the radiation conductor 12 in parallel is formed between the pattern 14b and the first grounding conductor 11.

Figure 8:
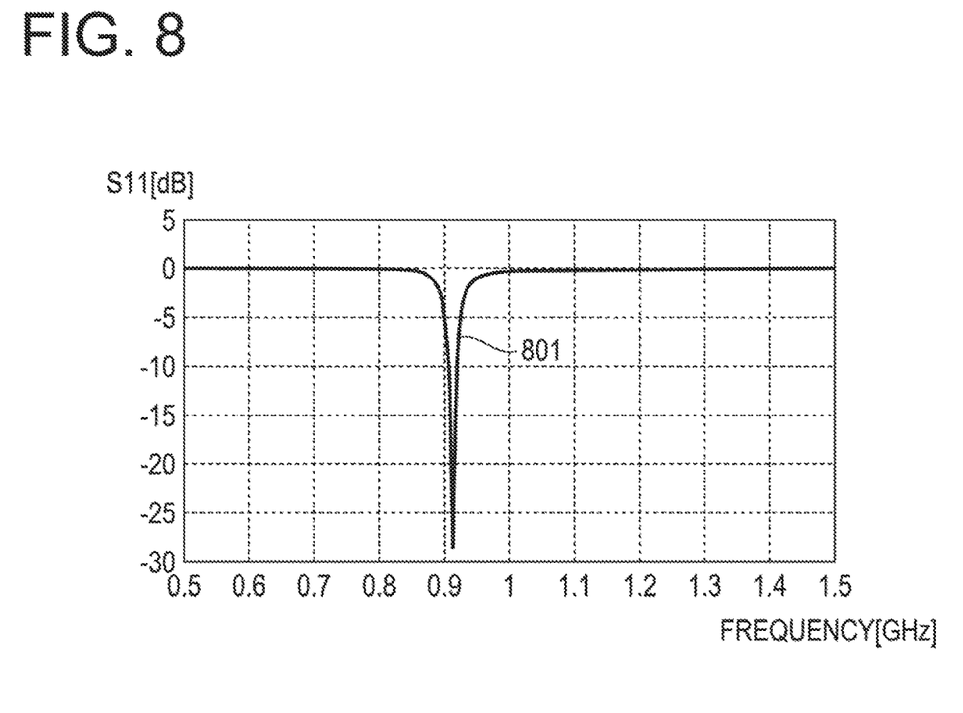
FIG. 8 is a diagram representing a frequency characteristic of parameter S11 of the antenna according to the modified example obtained by an electromagnetic field simulation.

FIG. 8 is a diagram representing a frequency characteristic of parameter S11 of the antenna 2 obtained by an electromagnetic field simulation. In FIG. 8, a horizontal axis indicates a frequency, and vertical axis indicates parameter S11. Further, a graph 801 indicates a frequency characteristic of parameter S11 of the antenna 2. Further, in the electromagnetic field simulation, in order to make the operating frequency be 920 MHz, a diameter of the first grounding conductor 11 is set to 52 mm and a thickness of the first grounding conductor 11 is set to 0.03 mm. Further, an inner diameter of an end portion at a bottom surface side of the second grounding conductor 13 is set to 52 mm, an inner diameter of an end portion at an upper surface side of the second grounding conductor 13 is set to 54 mm, and a thickness of the second grounding conductor 13 is set to 0.02 mm. Further, a length of the second grounding conductor 13 in the elongation direction of the radiation conductor 12 is set to 30 mm. Further, a length of the radiation conductor 12 in the elongation direction is set to 34 mm, and a diameter of the rod-shaped portion 12b is set to 2 mm. Further, a diameter of the disc-shaped portion 12d of the radiation conductor 12 is set to 45.5 mm and a thickness of the disc-shaped portion 12d is set to 0.03 mm. Further, the antenna 2 is assumed to be embedded in a dielectric body which has a radius of 30 mm, has a length of 34 mm in the elongation direction of the radiation conductor 12, and is in a cylindrical shape with the radiation conductor 12 as a center. Further, specific inductive capacity εr of the dielectric body is set to 4.2, and dielectric tangent tan δ is set to 0.003. Further, it is assumed that a bottom surface side and an outer periphery of the dielectric body, in which the antenna 2 is embedded, are surrounded by a conductor (not illustrated), and the first grounding conductor 11 and the second grounding conductor 13 are electric-field coupled to the conductor. Further, it is assumed that the circular pattern 14a of the matching circuit 14 is connected with the radiation conductor 12 at a center thereof and has a diameter of 6 mm. Further, a distance from the center of the pattern 14a to an inner side edge of the arcuate pattern 14b is set to 6.6 mm, and a distance from the center of the pattern 14a to an outer side edge of the arcuate pattern 14b is set to 8 mm. Further, a distance from the center of the pattern 14a to a side of the first grounding conductor 11 which faces the pattern 14a, is set to 10 mm. Further, the pattern 14b is assumed to be an arc having a central angle of 74° formed concentrically with the pattern 14a.

As represented in a graph 801, it is seen that at the operating frequency of 920 MHz, parameter S11 of the antenna 2 is −25 dB or less, and is satisfactorily impedance matched. Further, according to the electromagnetic field simulation, a gain of the antenna 2 is about −3 dB at 928 MHz in a plane parallel to the upper surface, thereby obtaining the satisfactory gain.

Figure 9:
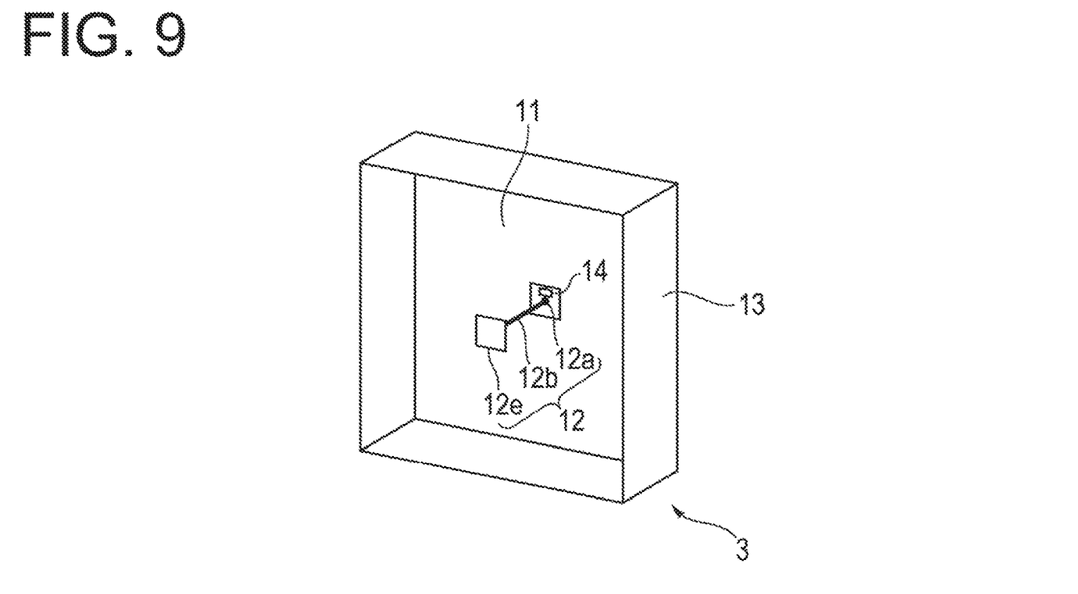
FIG. 9 is a perspective view of an antenna according to another modified example.

FIG. 9 is a perspective view of an antenna according to another modified example. An antenna 3 according to the present modified example also includes a first grounding conductor 11, a radiation conductor 12, a second grounding conductor 13, and a matching circuit 14, similarly to the antenna 1 according to the above-described embodiment. The antenna 3 according to the present modified example is different from the antenna 1 in a shape of each of the first grounding conductor 11, the radiation conductor 12, and the second grounding conductor 13. Accordingly, hereinafter, a shape of each of the first grounding conductor 11, the radiation conductor 12, and the third conductor 13 will be described.

In the present modified example, the first grounding conductor 11 is formed in a rectangular flat plate shape. Accordingly, the second grounding conductor 13 is also formed in a rectangular cylinder shape so as to follow an outer periphery of the first grounding conductor 11. Accordingly, a grounding conductor having a box shape, of which one surface of an upper surface side is opened, is formed by the first grounding conductor 11 and the second grounding conductor 13. Further, at least one of the first grounding conductor 11 and the second grounding conductor 13 may be electric-field coupled to a conductor forming a member, in which the antenna 3 is installed.

The radiation conductor 12 has a rod-shaped portion 12b elongated along a normal line of the first grounding conductor 11, and a flat plate-shaped portion 12e which feces the first grounding conductor 11 with the rod-shaped portion 12b interposed therebetween, is approximately parallel to the first grounding conductor 11, and is formed in a rectangular flat plate shape. Further, similarly to the above-described embodiment, an end point of the rod-shaped portion 12b at the first grounding conductor 11 side is a feeding point 12a, and the flat plate-shaped portion 12e is an opened end.

Similarly to the antenna 1 and the antenna 2, the antenna 3 according to the modified example may also suppress an influence of other conductors on a characteristic of the antenna 3 by the first grounding conductor and the second grounding conductor. Therefore, even when the antenna 3 is installed to be embedded in the member formed by the conductor, the antenna 3 may also emit or receive radio waves.

Figure 10A:
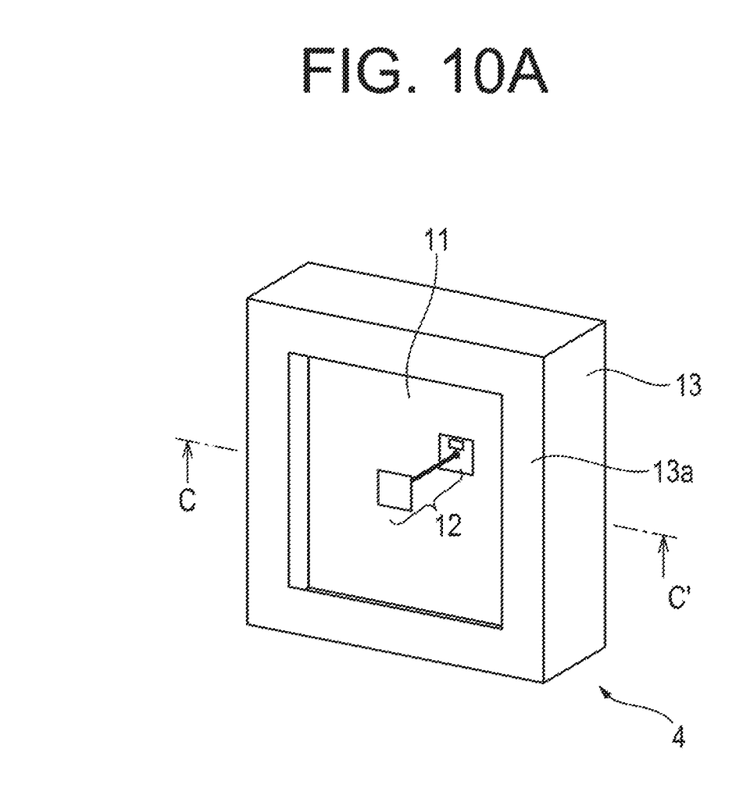
FIG. 10A is a perspective view of an antenna according to still another modified example.
Figure 10B:
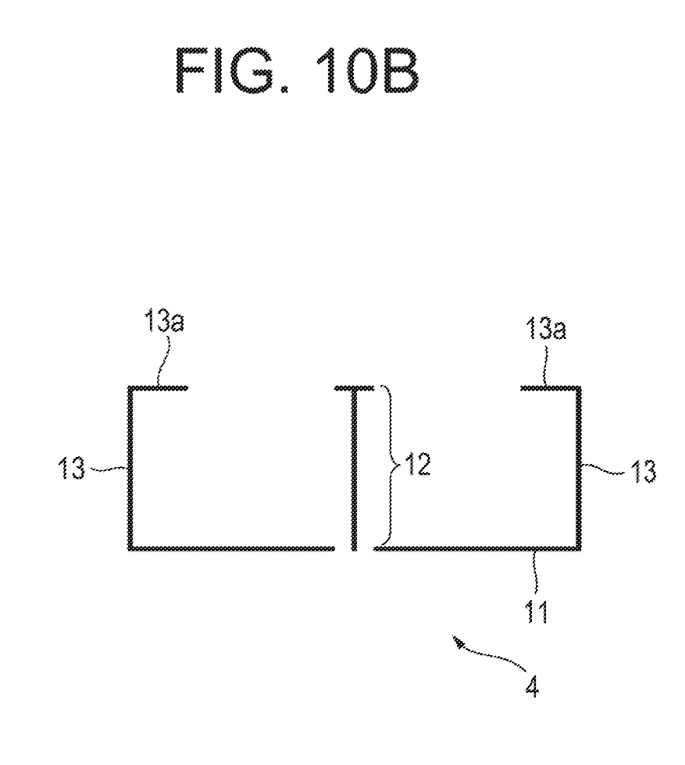
FIG. 10B is a lateral cross-sectional view of the antenna illustrated in FIG. 10A viewed from a side indicated by the arrow CC'.

FIG. 10A is a perspective view of an antenna according to still another modified example. FIG. 10B is a lateral cross-sectional view of the antenna illustrated in FIG. 10A viewed from a side indicated by the arrow CC'. An antenna 4 according to the present modified example is different from the antenna 3 illustrated in FIG. 9 in a shape of a second grounding conductor 13. Therefore, hereinafter, a shape of the second grounding conductor 13 will be described.

The second grounding conductor 13 included in the antenna 4 includes a protrusion 13a that protrudes toward an inner side, that is, toward a radiation conductor 12, along an upper surface at a side facing a first grounding conductor 11, that is, an end portion of an upper surface side. The second grounding conductor 13 includes the protrusion 13a, so that an influence of a conductor positioned at an outer periphery of the antenna 4 located at an external side of the second grounding conductor 13 on a characteristic of the antenna 4 is further decreased.

The protrusion 13a may also be formed to be elongated toward an external side along the upper surface. Even in this case, an influence of a conductor positioned at an outer peripetry of the antenna 4 on the characteristic of the antenna 4 is further decreased.

Figure 11A:
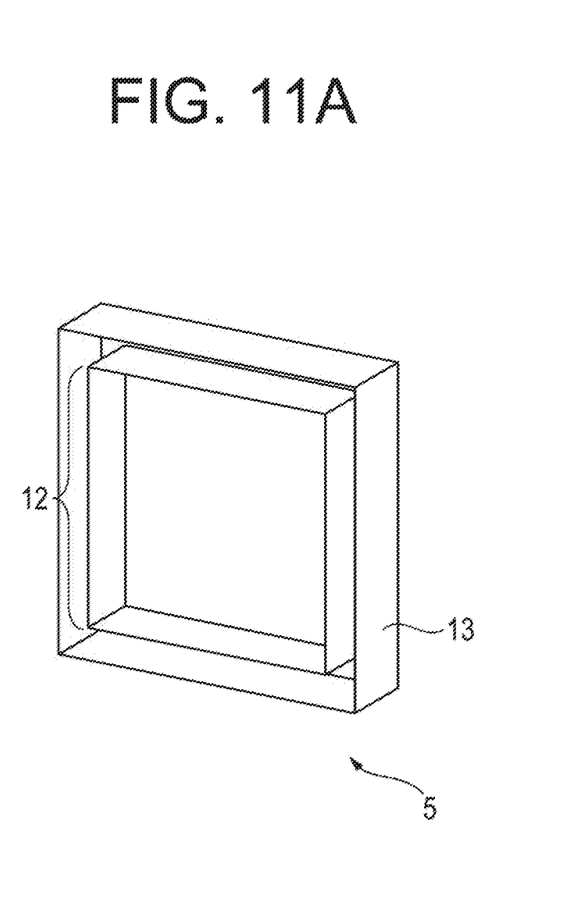
FIG. 11A is a perspective view of an antenna according to still yet another modified example.
Figure 11B:
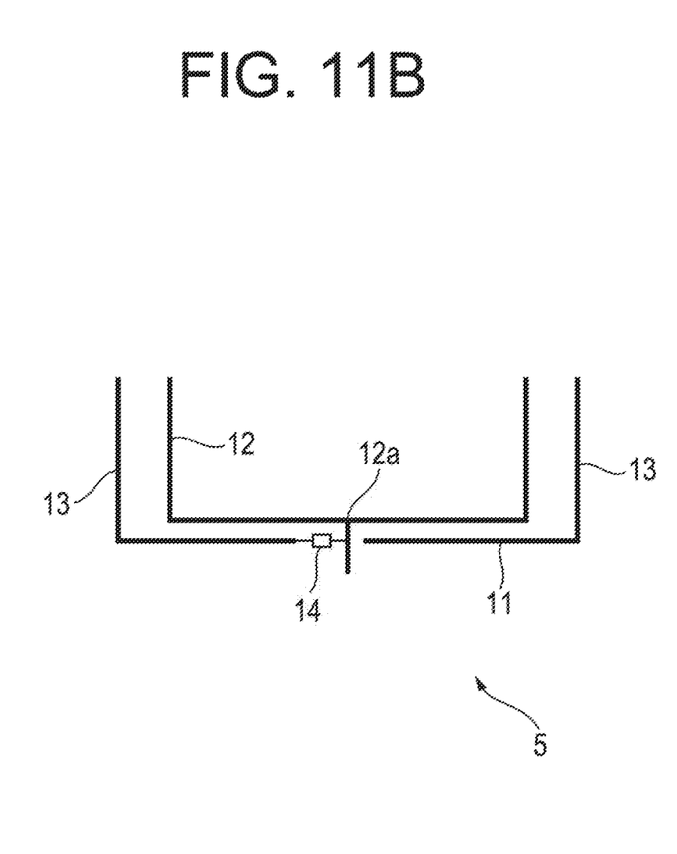
FIG. 11B is a lateral cross-sectional view of the antenna illustrated in FIG. 11A viewed from a side indicated by the arrow DD'.

FIG. 11A is a perspective view of an antenna according to still yet another modified example. FIG. 11B is a lateral cross-sectional view of the antenna illustrated in FIG. 11A viewed from a side indicated by the arrow DD'. An antenna 5 according to the present modified example also includes a first grounding conductor 11, a radiation conductor 12, a second grounding conductor 13, and a matching circuit 14, similarly to the antenna 1 according to the above-described embodiment. The antenna 5 according to the present modified example is different from the antenna 1 in a shape of each of the first grounding conductor 11, the radiation conductor 12, and the second grounding conductor 13. Accordingly, hereinafter, the shape of each of the first grounding conductor 11, the radiation conductor 12, and the second grounding conductor 13 will be described.

Similarly to the antenna 2 illustrated in FIG. 9, in the antenna 5 according to the present modified example, the first grounding conductor 11 is formed in a rectangular flat plate shape. Accordingly, the second grounding conductor 13 is also formed in a rectangular cylinder shape so as to follow an outer periphery of the first grounding conductor 11. Accordingly, a grounding conductor having a box shape, of which one surface of an upper surface side is opened, is formed by the first grounding conductor 11 and the second grounding conductor 13. Further, at least one of the first grounding conductor 11 and the second grounding conductor 13 may be electric-field coupled to a conductor that forms a member in which the antenna 5 is installed.

The radiation conductor 12 is also formed in a box shape, of which one surface of an upper surface side is opened, and is fed by a feeding point 12a positioned at substantially the center of a surface of a bottom surface side.

According to the present modified example, a gap between the radiation conductor 12 and the first grounding conductor 11, and a gap between the radiation conductor 12 and the second grounding conductor 13 may be adjusted. Accordingly, the antenna 5 may have a capacitive component between the radiation conductor 12 and the first grounding conductor 11, or between the radiation conductor 12 and the second grounding conductor 13. Accordingly, the radiation conductor 12 may perform an impedance matching by appropriately adjusting the gap between the radiation conductor 12 and the first grounding conductor 11, or the gap between the radiation conductor 12 and the second grounding conductor 13. Accordingly, in the antenna 5, a matching circuit 14 may be omitted. Further, a dielectric body may be filled in the gap between the radiation conductor 12 and the first grounding conductor 11, and the gap between the radiation conductor 12 and the second grounding conductor 13.

Similarly to the antenna according to the embodiment or the modified example described above, the antenna 5 according to the present modified example may also suppress an influence of other conductors on a characteristic of the antenna 5 by the first grounding conductor and the second grounding conductor. Further, according to the present modified example, a space is present at an inner side of the radiation conductor 12, and a communication circuit for transmitting or receiving radio waves via tire antenna 5, may be installed in the space. Accordingly, a size of the entire communication apparatus using the antenna 5 may be further reduced.

In the antennas 3 to 5 according to the modified examples illustrated in FIGS. 9 to 11B, the first grounding conductor 11 may be formed in a circular flat plate shape, and the second grounding conductor 13 may also be formed in a cylindrical shape. Further, in the antennas according to the embodiment and each of the modified example described above, the first grounding conductor 11 may also be formed in a curved shape, in which the radiation conductor 12 side has a concave shape. Even in this case, similarly to the embodiment and each of the modified example described above, the antenna may be installed in a space surrounded by a conductor.

In the antenna 1 illustrated in FIGS. 1A and 1B and the antenna 2 illustrated in FIGS. 7A and 7B, as illustrated in FIGS. 10A and 10B, a protrusion elongated toward the inner side along the upper surface may be formed in the end portion of the upper surface side of the second grounding conductor 13.

In the antenna according to the embodiment or the modified example described above, a hole that allows a signal line, which is a coaxial cable for feeding power to the radiation conductor 12, to pass through, may be formed in the second grounding conductor 13, instead of the first grounding conductor 11. Alternatively, the hole may not be formed in any grounding conductor. In this case, for example, the coaxial cable that feeds power to the radiation conductor 12 may be elongated from the feeding point 12a to the end portion of the upper surface side of the second grounding conductor 13 along the surfaces of the first grounding conductor 11 and the second grounding conductor 13, and may be pulled out of the antenna beyond the end portion.

The antenna according to the embodiment or the modified example described above may be accommodated in a housing formed in a box shape, of which one end of the upper surface side is opened, by a conductor. Further, the housing, in which the antenna according to the embodiment or the modified example described above is accommodated, may be embedded in a member formed by a conductor so that the end portion of the upper surface side of the antenna is opened. In this case, the conductor forming the housing and the conductor forming the member, in which the housing is embedded, may be the same as or different from each other.

Figure 12:
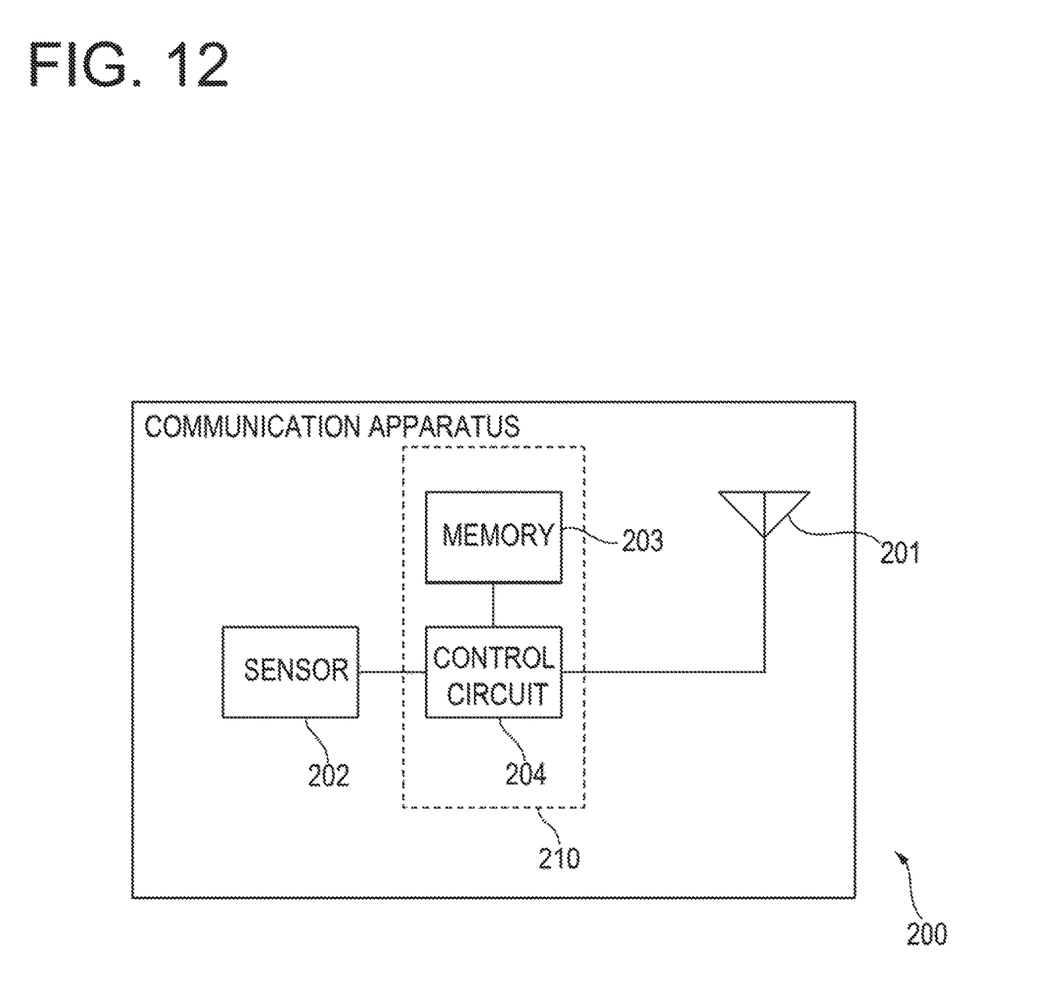
FIG. 12 is a schematic configuration diagram of a communication apparatus including the antenna according to the embodiment or any one of the modified examples.

FIG. 12 is a schematic configuration diagram of a communication apparatus including the antenna according to the embodiment or any one of the modified examples described above. A communication apparatus 200 is a wireless slave station used for, for example, a sewerage level monitoring system, and is installed in, for example, a manhole cover (not illustrated). The communication apparatus 200 includes an antenna 201, a sensor 202, a memory 203, and a control circuit 204. Among these elements, the memory 203 and the control circuit 204 are examples of a signal processing circuit 210 that emits radio signals via an antenna 201. Further, the memory 203 and the control circuit 204 is formed as, for example, one or a plurality of integrated circuits. Further, the signal processing circuit 210 is connected with the antenna 201 with, for example, a coaxial cable.

The antenna 201 is an antenna according to the embodiment or any one antenna of the modified examples described above. For example, the antenna 201 is embedded so that the upper surface side faces a sewerage side and an end portion of an upper surface side of the antenna 201 is opened for a manhole cover which is an example of a member formed of a conductor (not illustrated). Further, the end portion of the upper surface side of the antenna 201 may also be covered by a dielectric body. In this case, for example, as illustrated in FIG. 5A, the antenna 201 may be embedded in the manhole cover so that at least one of a first grounding conductor and a second grounding conductor of the antenna 201 is electric-field coupled to the conductor forming the manhole cover. Further, for example, the antenna 201 emits a radio signal received from the control circuit 204 as a radio wave to, for example, the inner side of the sewerage or a wireless base station attached onto a telephone pole and the like (not illustrated).

The sensor 202 is a sensor that detects a level within the sewerage, and may be any one of various sensors for water level detection. The sensor 202 detects a water level for every predetermined period, and notifies the control circuit 204 of the detected water level.

The memory 203 includes a non-volatile semiconductor memory circuit. Further, the memory 203 stores an ID code and the like for discriminating the communication apparatus 200 from another communication apparatus.

The control circuit 204 includes at least one processor, and generates a radio signal according to a predetermined wireless communication standard called Bluetooth Low Energy (BLE) (registered trademark) for every predetermined period. In this case, the control circuit 204 includes information that indicates a recent water level notified from the sensor 202 in the radio signal. Further, the control circuit 204 may read the ID code of the communication apparatus from the memory 203 and include the ID code in the radio signal. Further, the control circuit 204 outputs the radio signal to the antenna 201, and emits the radio signal to the antenna 201 as a radio wave.

The communication apparatus 200 may be a device embedded in a skin of an animal, such as stock. In this case, the antenna included in the communication apparatus 200 is opened at the upper surface, and is embedded so that at least one of the first grounding conductor and the second grounding conductor is electric-field coupled to the skin of the animal. Further, the communication apparatus 200 includes, for example, a sensor that detects biometric information about an animal (e.g., a thermometer, a blood pressure gauge, a pulsimeter, etc.). Further, the control circuit 204 of the communication apparatus 200 generates a radio signal that includes the biometric information detected by the sensor and conforms to a predetermined short range wireless communication standard (e.g., Body Area Network), and emits the generated radio signal to the antenna 201 as a radio wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An antenna comprising: a radiation conductor configured to be fed by one end which is a bottom surface of the antenna, have another end serving as an opened end, and emit or receive radio waves; a first grounding conductor configured to be installed at a side of the one end of the radiation conductor and be grounded; a second grounding conductor configured to be electrically coupled with the first grounding conductor and be formed in a cylindrical shape around the radiation conductor with an elongation direction of the radiation conductor as an axial direction; and at least one of the first grounding conductor and the second grounding conductor configured to be electric-field coupled with a conductor where the antenna is installed; the antenna is embedded in a dielectric body and then install in a concave portion so that the bottom surface of the antenna faces a bottom surface of the concave portion, wherein the concave portion having a diameter larger than a diameter of the dielectric body, and the diameter of the dielectric body is larger than a diameter of the second grounding conductor.

2. The antenna according to claim 1, wherein the radiation conductor is formed so as to have a larger size on a plane orthogonal to the elongation direction as the radiation conductor approaches the another end along the elongation direction of the radiation conductor.

3. The antenna according to claim 1, wherein the second grounding conductor is formed with a protrusion that protrudes toward the radiation conductor at an end portion of a side opposite to the first grounding conductor.

4. The antenna according to claim 1, wherein the first grounding conductor is formed in a flat plate shape,
the second grounding conductor is electrically connected with an outer periphery of the first grounding conductor at one end of the second grounding conductor, and
the radiation conductor includes a flat plate portion, which includes the one end and is substantially parallel to the first grounding conductor, and a cylindrical portion, which includes the another end and is formed in a cylindrical shape along an outer periphery of the flat plate portion.

5. The antenna according to claim 1, wherein the second grounding conductor is formed so that a length of the second grounding conductor in the elongation direction of the radiation conductor is equal to or smaller than a length from the one end to the another end of the radiation conductor.

6. The antenna according to claim 1, further comprising:
a matching circuit that matches impedance of the antenna to predetermined impedance,
wherein the matching circuit is formed as a pattern by a conductor between the first grounding conductor and the one end of the radiation conductor.

7. A communication apparatus comprising: an antenna including, a radiation conductor configured to be fed by one end which is a bottom surface of the antenna, have another end serving as an opened end, and emit or receive radio waves, a first grounding conductor configured to be installed at the one end side of the radiation conductor and be grounded, a second grounding conductor configured to be electrically coupled with the first grounding conductor and be formed in a cylindrical shape around the radiation conductor with an elongation direction of the radiation conductor as an axial direction, and at least one of the first grounding conductor and the second grounding conductor configured to be electric-field coupled with a conductor where the antenna is installed; and a signal processing circuit configured to emit or receive radio waves via the antenna; the antenna is embedded in a dielectric body and then install in a concave portion so that the bottom surface of the antenna faces a bottom surface of the concave portion, wherein the concave portion having a diameter larger than a diameter of the dielectric body, and the diameter of the dielectric body is larger than a diameter of the second grounding conductor.

\* \* \* \* \*